Oct. 27, 1959 L. A. RUSSELL 2,910,595

MAGNETIC CORE LOGICAL CIRCUIT

Filed July 18, 1956 2 Sheets-Sheet 1

INVENTOR.
LOUIS A. RUSSELL
BY
William V. Schelberg
AGENT

United States Patent Office 2,910,595

Patented Oct. 27, 1959

2,910,595

MAGNETIC CORE LOGICAL CIRCUIT

Louis A. Russell, Poughkeepsie, N.Y., assignor to International Business Machines Corporation, New York, N.Y., a corporation of New York Application July 18, 1956, Serial No. 598,651

10 Claims. (Cl. 307—88)

This invention relates to circuits for performing logical operations and particularly to a circuit arrangement employing magnetic cores and adapted to function as a multiple signal coincidence device.

Switching networks of various kinds have utility in data handling machines and comprise networks to which signals are applied and from which signals are obtained that are some prescribed function of the input signals. Such components are desirably fabricated from magnetic core elements due to their inherent reliability, lack of maintaining power and heat development, and it is to such arrangements generally that this invention pertains.

In accordance with the present invention, magnetic cores are employed in a circuit configuration for logical information storage and are interconnected through coupling magnetic cores so that the use of diodes, which consume appreciable power, are avoided and economical cores of ferrite materials may be utilized.

Circuit performance is based upon the ability of a saturable magnetic core to distinguish the presence of a predetermined number of input signal impulses through the use of an applied inhibiting threshold, as well as preventing the transfer of unwanted pulses by this means and by the threshold coercive force of the magnetic material.

This feature allows the switching system to function as a multiple coincidence detecting component or one that will recognize the presence of a predetermined number of input signals out of a plurality that may be applied.

The circuit arrangement to be described comprises an improvement over that set forth in the copending patent application, Serial Number 548,581, filed November 23, 1955, on behalf of Louis A. Russell and assigned to the same assignee.

An object of the invention is to provide an improved all magnetic core logical circuit network wherein an intermediate ferrite core and resistance element operates as a coupling device to replace the conventionally used diodes.

Another object is to provide an improved logical circuit device wherein lower power requirements are achieved allowing the use of ferrite cores with windings of relatively few turns.

Still another object of the invention is to provide a logical circuit arrangement including saturable coupling cores for controlling the transfer of information pulses between storage magnetic cores that are provided with a predetermined inhibitive force threshold.

Other objects of the invention will be pointed out in the following description and claims and illustrated in the accompanying drawings, which disclose, by way of example, the principle of the invention and the best mode, which has been contemplated, of applying that principle.

Figure 1:
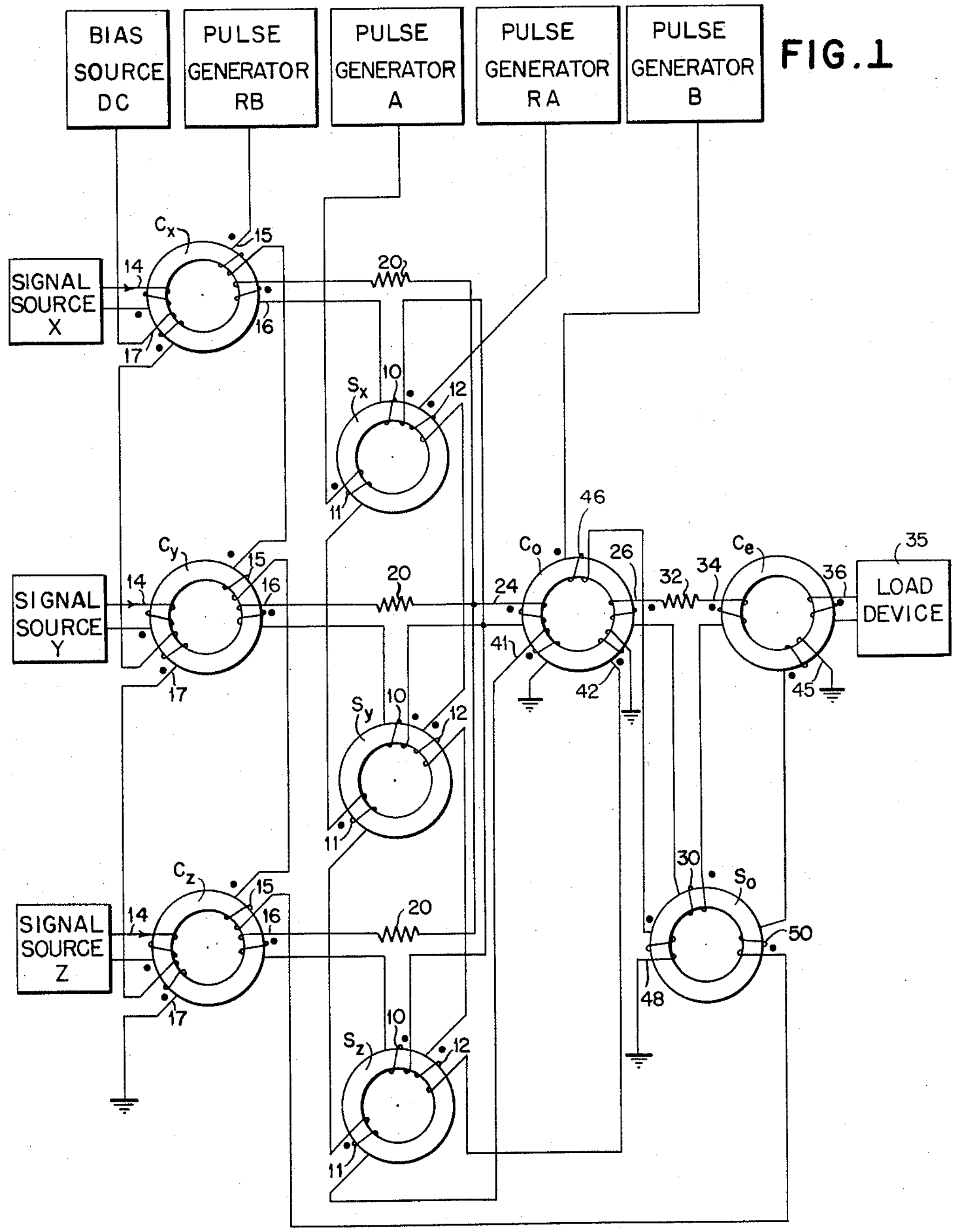
Figure 1 is a circuit diagram of a magnetic core circuit comprising one embodiment of the invention and utilizing the coercive force threshold and inhibitive threshold of storage and coupling cores in preventing spurious transfer of information pulses.

Referring to Figure 1, a three input coincidence circuit is illustrated wherein the necessary interstage isolation during transfer of information is provided without resort to diode elements. A coincidence of three input signal impulses is required for producing an output indication in the circuit to be described, however, through adjustment of certain parameters as will be more evident hereafter, the circuit may be made to operate and provide an output signal when a predetermined lesser or greater number of input signals are received.

Each input signal section comprises a coupling core C and storage core S, both of which may be of square loop magnetic ferrite material, however it is essential that the coupling cores exhibit a hysteresis characteristic only with appreciable retentivity. The storage cores S are each provided with a signal winding 10 and a pair of control windings 11 and 12, respectively, while the coupling cores C are provided with an input winding 14, a control winding 15, an output winding 16 and a bias winding 17.

As shown in the figure, a dot marking is placed adjacent one end of each of these windings to indicate polarity, with current flow into the dot marked terminal tending to switch the core to a datum or binary zero remanence condition.

The signal winding 10 of each storage core S serves both input and output functions and is connected in series with the output winding 16 of its associated coupling core C, a resistor 20 and the input winding 24 of a coupling core $C_o$ that is provided in the output section of the circuit. Signal sources designated X, Y and Z are shown coupled to the windings 14 of cores $C_x$, $C_y$ and $C_z$ of the three input signal sections illustrated and the three output winding circuits are parallel connected. The output section core $C_o$ is provided with an output winding 26 that is series connected with a signal winding 30 arranged on an output storage core $S_o$, a resistor 32 and an input winding 34 of a further coupling core $C_e$. This latter coupling core may be the input coupling core of a further logical system or may be connected to a load device 35 as illustrated in block diagram form through an output winding 36.

Figure 2:
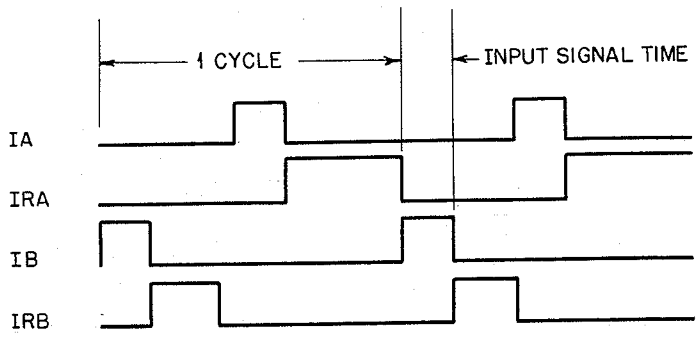
Figure 2 illustrates the relative timing of current impulses that are required for operating the circuit of Figure 1.

A series of four current pulses are required for operating the system and are provided by pulse generating sources shown in block form and labeled A, RA, B and RB. The source A is coupled to windings 11 of the cores $S_x$, $S_y$ and $S_z$ and with a winding 41 of the core $C_o$. The source RA is coupled to the windings 12 of cores $S_x$, $S_y$ and $S_z$ and with a winding 42 of core $C_o$. The source B is coupled with a winding 46 of the core $C_o$ and a winding 48 of the core $S_o$, while the source RB is operative on the core $S_o$ through a winding 50, on the core $C_e$ through a winding 45 and on the cores $C_x$, $C_y$ and $C_z$ through the windings 15. The bias windings 17 provided on each of the input coupling cores is also connected to a source of direct current designated as D.C. and a similar bias winding (not shown) may also be provided for all of the storage cores S and for the output core $C_e$ tending to maintain these cores near their positive threshold. Such a bias is employed to advantage in operating the system at high speeds but is not essential to proper functioning of the system and may be eliminated from the cores $C_x$, $C_y$ and $C_z$ when operating at low pulse rates. The current pulses developed by the sources A, B, RD and RB tend to drive the cores upon which they operate toward a zero state and the sequence of pulses delivered by these generators is shown in Figure 2.

The pulse sources A, RA, B and RB may comprise electron tube devices, magnetic core drivers or transistor driven pulse transformers of the type described and claimed, for example, in the copending patent application of J. B. Mackay et al., Serial Number 511,082, filed May 25, 1955, and which application is assigned to the same assignee.

Figure 3:
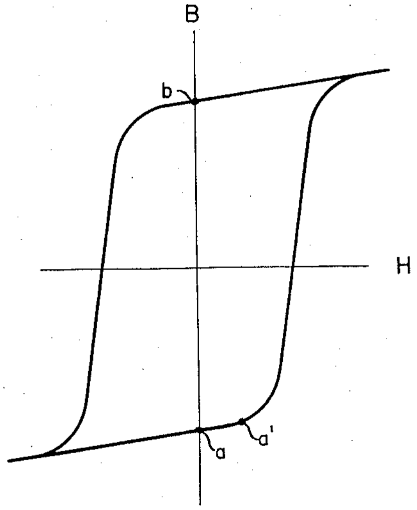
Figure 3 illustrates the hysteresis characteristic obtained for certain ferrite magnetic materials, with the curve representative of a square loop type material having appreciable retentivity and a coercive force threshold.

The hysteresis loop illustrated in Figure 3 is representative of a typical characteristic for a square loop ferrite composition, with the vertical axis representing magnetic flux density B and the horizontal axis the applied field strength H, wherein the residual flux density is a large fraction of the saturation flux density and the curve has substantially square knees indicative of a threshold coercive force. The storage cores S are of such square loop material while the coupling cores C may be of like material or may have a characteristic with a lesser coercive force threshold.

In explaining the operation of the logical switching device, each of the cores S and C are assumed to be in a zero remanence state or at point *a* on the hysteresis loop shown in Figure 3. Point *b* on the curve represents a one or the stored remanence condition of a core.

Referring now to Figure 2 where the sequence of shift pulses is shown, the pulse $I_A$ from source A occurs first and, being directed into the dot marked terminals of the windings 11 on cores $S_x$, $S_y$ and $S_z$ and the winding 41 on core $C_o$, these cores are driven toward negative saturation. The pulse $I_{RA}$ from source RA is likewise directed into the dot marked terminals of the windings 12 on cores $S_x$, $S_y$ and $S_z$, and the winding 42 on core $C_o$ tending to drive these cores toward negative saturation. In a similar manner, the source B develops pulses $I_B$ tending to switch the cores $C_o$ and $S_o$ toward negative saturation when the windings 46 and 48 are energized. Source RB is operative on the cores $C_x$, $C_y$, $C_z$ $S_o$ and $C_e$, tending to establish a state of negative remanence in these cores. The bias current from the source D.C. is employed only when the coupling cores are of square loop material and is directed into the unmarked terminal of the windings 17 of coupling cores $C_x$, $C_y$ and $C_z$ and biases these cores toward positive saturation or to point *a'*. As previously mentioned, such a bias may also be applied on $S_x$, $S_y$, $S_z$, $S_o$ and $C_e$, but is not essential for moderate operating speeds.

Input signals are supplied to the circuit through the sources X, Y and Z and tend to switch the cores $C_x$, $C_y$ and $C_z$ to a one remanence state of from point *a'* to point *b*. When an input signal is received by the winding 14 of core $C_x$, for example, and this core is switched, a voltage is induced across the output winding 16 such that the dot marked terminal is negative. This causes current flow into the undotted end of winding 10 of the core $S_x$ causing this core to be switched to state *b* also. Since the current caused by the switching of core $C_x$ also flows through winding 24 of core $C_o$, this core tends to switch to state *b* but such a flux change is opposed by the clock pulse $I_B$ which is applied at input signal time and core $C_o$ is held at point *a*.

The clock pulse $I_{RB}$ occurs subsequently and the cores $C_x$, $C_y$ and $C_z$ that received an input signal are now reset at a slow enough rate that the current caused to flow in the circuit loop coupling cores $C_x$—$S_x$—$C_o$, $C_y$—$S_y$—$C_o$, $C_z$—$S_z$—$C_o$ is insufficient to switch the cores $S_x$, $S_y$ or $S_z$ toward the zero state.

Following the $I_{RB}$ pulse, $I_A$ occurs and is operative on the cores $S_x$, $S_y$ and $S_z$ to drive them toward the zero state if any of these S cores have been established at a one state or at point *b* on the hysteresis loop, then a large flux change occurs causing a voltage to be induced across the winding 10 and current flow through the winding 24 of core $C_o$, directed into the unmarked terminal or in a direction to establish this core at the one remanence state *b*. The total current flowing through the winding 24 is substantially proportional to the number of input storage cores S that are being returned to zero by the $I_A$ pulse, or the number of input signals that have been applied initially. The $I_A$ pulse is also applied at this time to core $C_o$ and this core is held toward negative saturation by a force proportional to the ampere turns developed by winding 41. The number of turns of this winding is adjusted so that if all three cores $S_x$, $S_y$ and $S_z$ are being switched to zero at this time the current through the winding 24 overcomes the inhibiting action of $I_A$ in winding 41 and core $C_o$ switches to state *b*. When this occurs the flux change in core $C_o$ causes current flow in the loop including windings 26, 30, 34 and resistor 32 in such a direction as to switch the core $S_o$ to state *b*. The current flow in this loop is in such a direction as to switch the core $C_e$, however, only the core $S_o$ is switched because the winding 30 is provided with a greater number of turns than the winding 34. On the other hand, if less than all of the cores $S_x$, $S_y$ and $S_z$ are reset from point *b* to point *a*, the current through the winding 24 of core $C_o$ is insufficient to overcome the inhibiting force of $I_A$ acting through winding 41 and core $S_o$ remains at point *a* on the hysteresis loop.

The following $I_{RA}$ clock pulse now resets the core $C_o$, if all three input signals have been applied initially, and this occurs at a rate in lieu thereof to disturb the state of core $S_o$.

The clock pulse $I_B$ is subsequently effective to reset the core $S_o$ and cause an output to develop as a result of the voltage induced across winding 30 causing core $C_e$ to switch to state *b* and deliver a signal to the load 35. A subsequent set of input signals may be applied by the sources X, Y and Z at this time without interfering with delivery of an output signal indicating receipt of the set of input signals considered and, when the following clock pulse $I_{RB}$ resets the cores $C_x$, $C_y$ and $C_z$ at the same time as the core $C_e$, the latter core is prepared for receiving a transfer pulse resulting from the second set of information signals.

The circuit arrangement described distinguishes from the system set forth in the aforementioned copending application, Serial Number 548,581, primarily in that discrimination between the current developed by resetting two and of three cores is accomplished by reliance on the inhibiting effect of the winding 41 on core $C_o$ rather than the inherent threshold coercive force of the core. This inhibiting threshold provides a flexible control that may be readily adjusted to allow a more diverse switching operation and provides a built in correction for variations in amplitude of $I_A$ since when this current changes, the output of the cores $S_x$, $S_y$ and $S_z$ also changes but the inhibiting effect of winding 41 on core $C_o$ is correspondingly changed. In addition, when the output core $C_o$ is reset to zero by the current $I_{RA}$, back transfer of information to the cores $C_x$, $C_y$ and $C_z$ is prevented by the action of the $I_{RA}$ current on the windings 12 to inhibit writing a one in these cores or shifting them to point *b*, rather than relying on their threshold coercive force. Similarly, when the current $I_B$ is operative on the core $S_o$ spurious transfer of information to the core $C_o$ is prevented by the action of the winding 46 and, when core $C_e$ is reset by $I_{RB}$, the transfer of spurious information to core $S_o$ is prevented by the winding 50.

Each of the cores $S_x$, $S_y$, $S_z$, $S_o$ and $C_e$ may be biased from the datum remanence state in a positive direction as at state *a'* by providing an additional winding on these cores energized from the source D.C. This modification of the circuit decreases the power requirements of the input signal and allows the pulse transfer action to take place with increased reliability and speed.

The circuit as described comprises a three input coincidence logical switching network, however, a two input device may be obtained by eliminating or not using one of the input branches as for example, the cores $C_z$ and $S_z$, with the inhibiting action of $I_A$ current flowing through the winding 41 of core $C_o$ reduced to about one half that employed with the three input arrangement. With a lesser value of ampere turns developed by winding 41 and three or more inputs used, the circuit is effective to indicate the presence of a predetermined number out of a plurality of such inputs. For example, with the ampere turns adjusted to allow a single input signal and the consequent resetting of a single core $S_x$, $S_y$ or $S_z$ to be effective in developing a sufficiently larger transfer pulse to switch the core $C_o$, then a three way "inclusive or" switching circuit is provided.

In the circuit arrangement described, the cores S and C may comprise toroids of magnesium-manganese ferrite having an outside diameter of 0.100 inch, inside diameter of 0.070 inch and thickness of 0.120 inch. This thickness may be obtained by stacking four cores each of 0.030 inch thickness and winding the stack of cores as a single core unit. The windings 10 and 30 may have ten turns, the windings 11, 14, 24, 34, 41, 46 and 48 may have five turns, the windings 12, 15, 42, 45 and 50 may have three turns, the windings 17, two turns, and the windings 16, 26 and 36 may have twelve turns with the resistors 20 and 32 of 5.6 ohms each. While particular values are indicated, their inclusion is in the interest of providing a complete disclosure and should not be considered limiting as to parameters suitable for proper operation as other cores and values may be equally satisfactory. Further, with proper adjustment of turns and current magnitudes, the number of input sections operative on the output coupling core may be modified as desired.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the following claims.

What is claimed is:

1. A logical circuit network comprising a plurality of storage magnetic cores; signal, reset and inhibit winding means on said cores; a coupling magnetic core associated with each said storage cores; input, output and reset winding means on said coupling cores; an output magnetic core; input, output, reset and inhibit winding means on said output cores; each of the storage magnetic cores and the coupling magnetic cores capable of assuming bistable states of magnetic remanence; first circuit means series connecting the output winding means of said coupling magnetic cores with the signal winding means of said associated storage cores and the input winding means of said output core; second circuit means series connecting the reset winding means of said storage magnetic cores and the inhibit winding means of said output core; third winding means series connecting the reset winding means of said output core with the inhibit winding means of said storage cores; and means for sequentially energizing said second and third circuit means.

2. A logical circuit network as set forth in claim 1 including means for biasing each of said cores toward one remanence condition comprising further winding means energized from a direct current source.

3. A binary logical circuit network including a plurality of magnetic cores each capable of assuming bistable states of magnetic remanence; signal, reset and inhibit winding means on said cores; circuit means electro-conductively connecting the signal winding means on adjacent cores for transfer of electrical impulses therebetween; circuit means for energizing the reset winding means of one core and the inhibit winding means of the adjacent core simultaneously whereupon the transfer of information impulses therebetween is controlled by the ampere turns of said windings.

4. A logical circuit network as set forth in claim 3 including means for biasing said cores toward one remanence threshold condition comprising further winding means energized from a direct current source.

5. A logical coincidence switching network comprising a plurality of storage magnetic cores; signal, reset and inhibit winding means on said storage cores; an input coupling magnetic core associated with each said storage core; input, output and reset winding means on said coupling cores; an output storage magnetic core; signal, reset and inhibit winding means on said output storage core; an output coupling core associated with said output storage core; input, output, reset and inhibit winding means on said output coupling core; each of said cores capable of assuming bistable states of magnetic remanence; first circuit means series connecting the output winding means of said input coupling cores with the signal winding means of said associated storage magnetic cores and the input winding means of said output coupling core; second circuit means series connecting the output winding means of said output coupling core and the signal winding means of said output storage core; means for selectively applying signals to the input winding means of said input coupling cores; means for simultaneously energizing said reset winding means of said storage cores and the inhibit winding means of said output coupling core; means for simultaneously energizing the reset winding means of said output coupling core and the inhibit winding means of said storage cores; and means for energizing the reset winding means of said output storage core.

6. A logical switching network comprising a plurality of storage magnetic cores each capable of assuming opposite stable remanence states in representing binary information; signal, reset and inhibit winding means on said storage cores; an input coupling magnetic core associated with each said storage core; input, output and reset winding means on said coupling cores; an output storage magnetic core; signal, reset and inhibit winding means on said output storage core; an output coupling core associated with said output storage core; input, output, reset and inhibit winding means on said output coupling core; each of said cores capable of assuming bistable states of magnetic flux remanence; first circuit means including a resistor series connecting the output winding means of each said input coupling core with the signal winding means of the associated storage core and the input winding means of said output coupling core; second circuit means including a resistor series connecting the output winding means of said output coupling core and the signal winding means of said output storage core; signal means for selectively energizing the input winding means of said input coupling cores; clock pulse generator means for simultaneously energizing the reset winding means of said storage cores and the inhibit winding means of said output coupling cores; further clock pulse generator means for thereafter simultaneously energizing the reset winding means of said output coupling core and the inhibit winding means of said storage cores; and means for subsequently energizing the reset winding means of said output storage core.

7. A binary logical circuit network including a plurality of storage magnetic cores; output and reset windings on said storage cores; a coupling magnetic core; input, inhibit and output windings on said coupling core; said storage magnetic cores and said coupling core capable of assuming bistable states of magnetic remanence; circuit means connecting the output windings of said storage cores with the input winding of said coupling core, pulse generator means operable to simultaneously energize the reset windings on said storage cores to read out said storage cores and simultaneously to energize the inhibit winding on said coupling core whereupon the residual magnetic state of said coupling core is changed only upon resetting of a predetermined number of said storage cores.

8. A logical circuit network as set forth in claim 7 including means for biasing said cores toward one remanence condition comprising winding means energized from a direct current source.

9. A magnetic core logical switching network including a plurality of saturable magnetic cores capable of attaining opposed states of residual flux density in representing binary logical information, winding means on said cores operable to receive information signals and establish one of said remanence states and to deliver information signals when reset to the other of said remanence states; reset winding means on said cores operable when energized to reset said cores to said other remanence state if not already in said state; inhibit winding means on said cores operable when energized to oppose a change from said other remanence state to said one remanence state; circuit means interconnecting the winding means operable to deliver information signals on one of said cores with the winding means operable to receive information signals on another of said cores; means for energizing the reset winding means on said one of said cores and the inhibit winding means on said another of said cores whereupon pulses developed by resetting one core that are less than a predetermined magnitude are ineffective to change the remanence state of said another core; and means for energizing the reset winding of said another core and the inhibit winding means of said one core whereupon transfer of pulses from the information receiving winding of said another core to the information delivering winding of said one core are ineffective to change the state of said one core.

10. A binary logical circuit network including a plurality of storage magnetic cores; output, reset and inhibit windings on said storage cores; a coupling magnetic core; input, output, reset and inhibit windings on said coupling core; said storage magnetic cores and said coupling magnetic core capable of assuming bistable states of magnetic remanence; circuit means connecting the output windings of said storage cores with the input winding of said coupling core; first pulse generator means operable to simultaneously energize the reset windings of said storage cores and the inhibit winding of said coupling core whereupon the residual magnetic state of said coupling core is changed only upon resetting of a predetermined number of said storage cores; and second pulse generator means operable to energize the reset winding of said coupling magnetic core and simultaneously energize the inhibit windings of said storage magnetic cores whereupon a change in the remanence magnetic state of said storage cores is prevented on resetting of said coupling core.

References Cited in the file of this patent

UNITED STATES PATENTS

| | | |
|---|---|---|
| 2,673,337 | Avery | Mar. 23, 1954 |
| 2,734,184 | Rajchman | Feb. 7, 1956 |
| 2,742,632 | Whitely | Apr. 17, 1956 |
| 2,753,545 | Lund | July 3, 1956 |